April 28, 1959  J. W. MORTON  2,884,504
ELECTRIC CONTROLLERS
Filed April 12, 1954  4 Sheets-Sheet 1
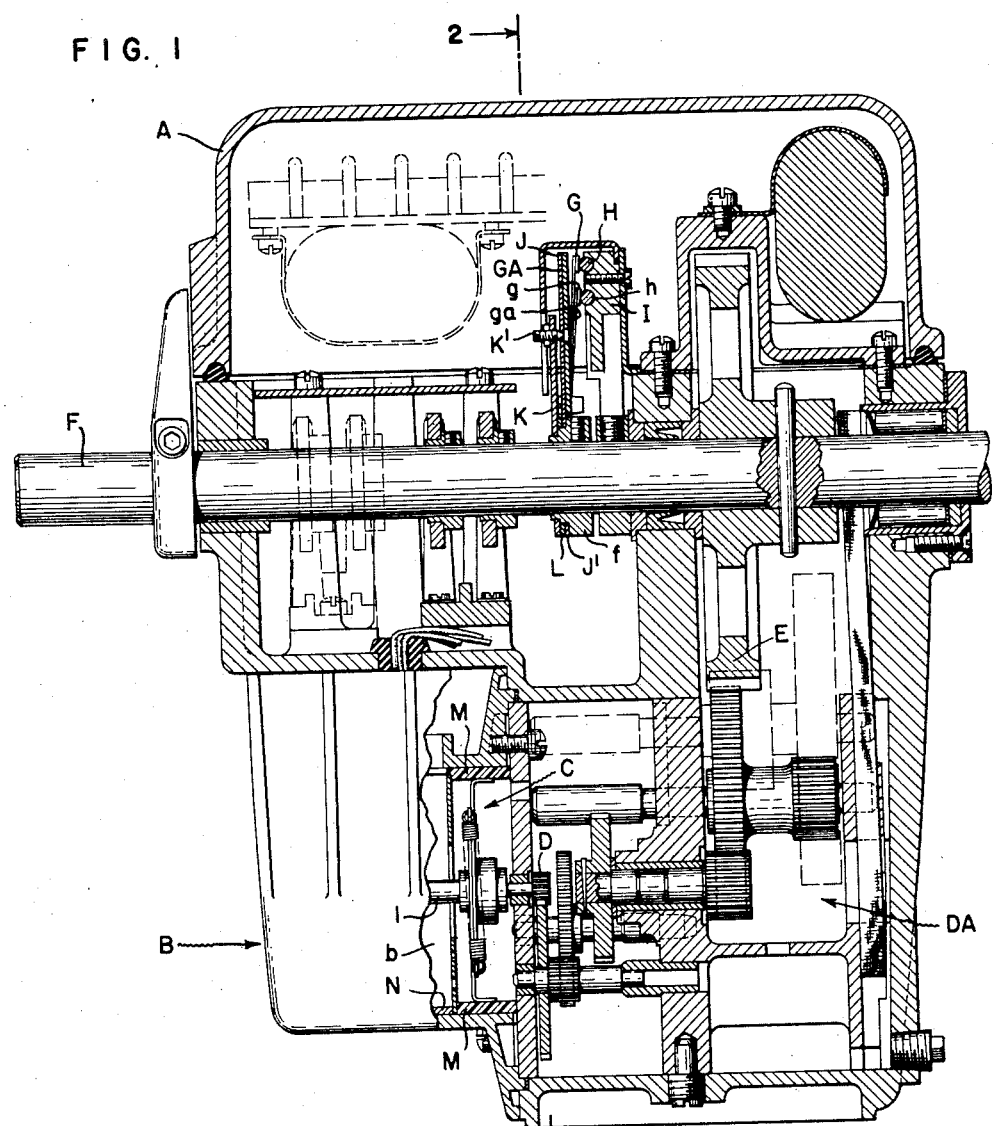
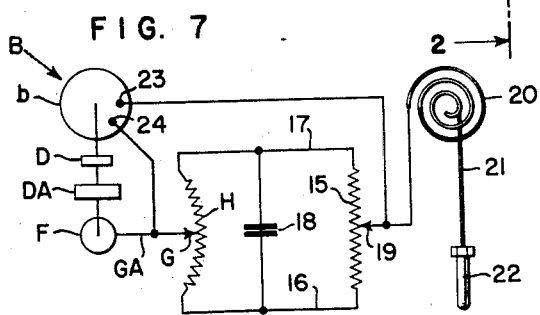
INVENTOR.
JOHN W. MORTON
BY Arthur H. Swanson
ATTORNEY.

April 28, 1959  J. W. MORTON  2,884,504
ELECTRIC CONTROLLERS

Filed April 12, 1954  4 Sheets-Sheet 2

INVENTOR.
JOHN W. MORTON
BY
ATTORNEY.

April 28, 1959 J. W. MORTON 2,884,504
ELECTRIC CONTROLLERS
Filed April 12, 1954 4 Sheets-Sheet 3
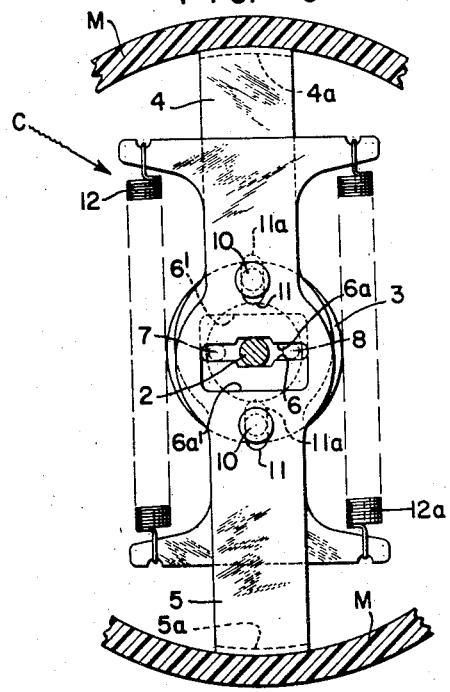
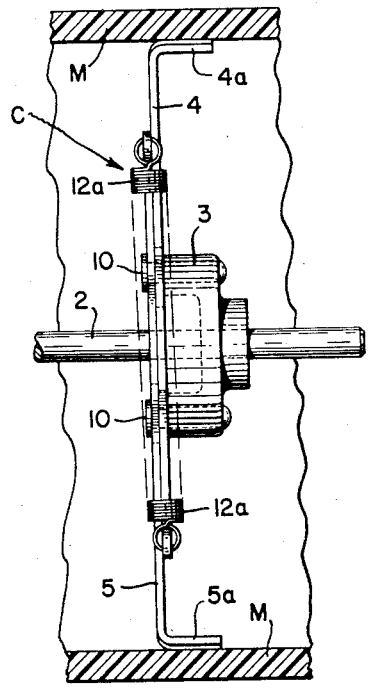
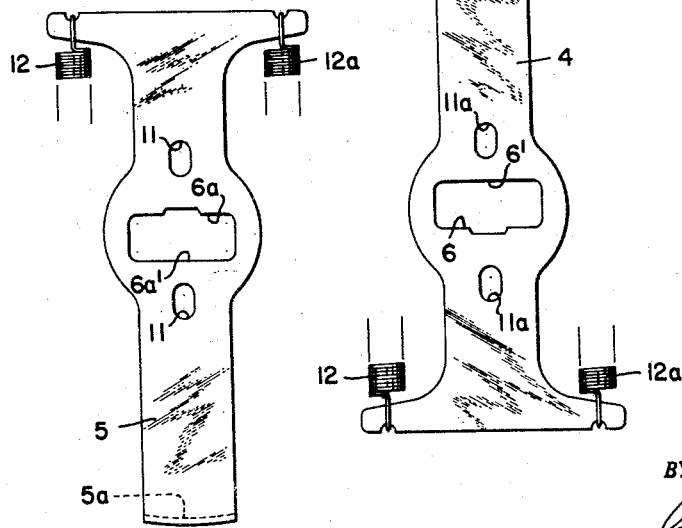
INVENTOR.
JOHN W. MORTON
BY
ATTORNEY.

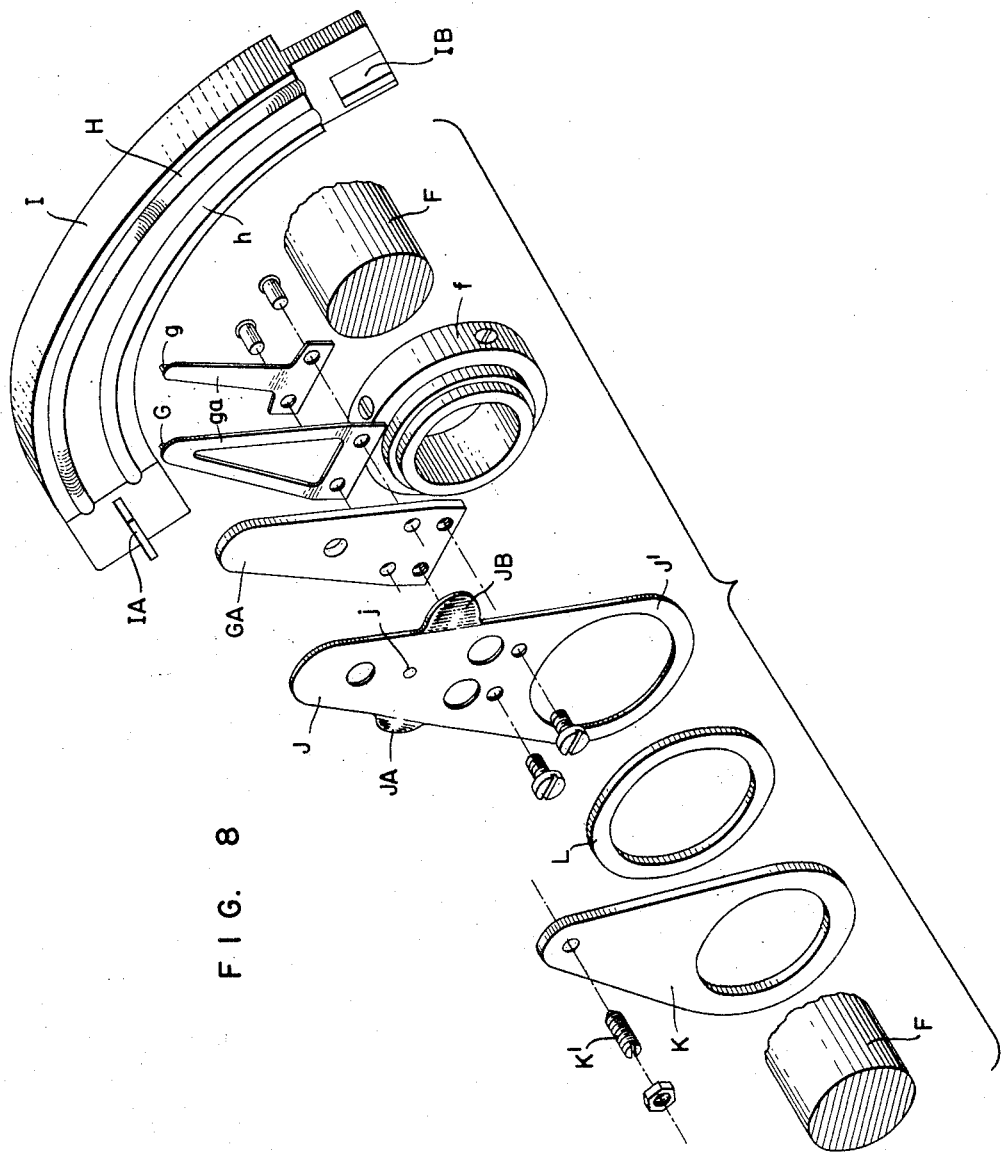

United States Patent Office 2,884,504
Patented Apr. 28, 1959

2,884,504

ELECTRIC CONTROLLERS

John W. Morton, Philadelphia, Pa., assignor to Minneapolis-Honeywell Regulator Company, Minneapolis, Minn., a corporation of Delaware Application April 12, 1954, Serial No. 422,617

4 Claims. (Cl. 201—48)

The present invention comprises an improved motor mechanism adapted for use in operating control valves, dampers, burners, rheostats, adjustable transformers, mechanical speed changers and analogous mechanical devices in response to the actuation of electrical control instruments and relays. Instruments and relays especially suitable for the above mentioned use, include manual reset proportioning relays, remote manual push button or positioning stations, and other instruments, such for example as those instruments and relays disclosed in the Moore Patent 2,647,252 of July 28, 1953, which are especially suitable for such use. The said motor mechanism is ordinarily reversible and is set into operation on an increase or decrease in a control condition to adjust a wiper contact in one direction or the other along a slide wire resistor to thereby rebalance a self-balancing control circuit in which said resistor is included.

The general object of the present invention is to provide an improved motor mechanism of the type described which is of novel character and is characterized by its simplicity and effectiveness.

A specific object of the invention is to provide such a mechanism with novel and effective means for avoiding or minimizing over-travel of said wiper contact.

A more specific object of the invention is to provide a motor mechanism with novel means of a simple and effective character for automatically subjecting the motor to a braking action as each rebalancing operation is concluded, and for automatically eliminating the braking action when a new rebalancing action is required.

The various features of novelty which characterize my invention are pointed out with particularlity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 1 is an elevation of a motor mechanism partly in section on the line 1—1 of Fig. 2 as viewed in the direction of the arrows;

Fig. 3 is a side elevation of the brake mechanism with parts in vertical cross section;

Fig. 4 is a side elevation at right angles to Fig. 3 including the motor shaft and the braking elements of the motor mechanism;

Figs. 5 and 6 are side elevations like Fig. 3, each showing a different one of two braking elements in operative relation to the motor shaft; and Fig. 7 is an electric circuit diagram illustrating a circuit in which the improved motor mechanism may be employed.

Fig. 8 is an exploded, perspective view.

Figure 2:
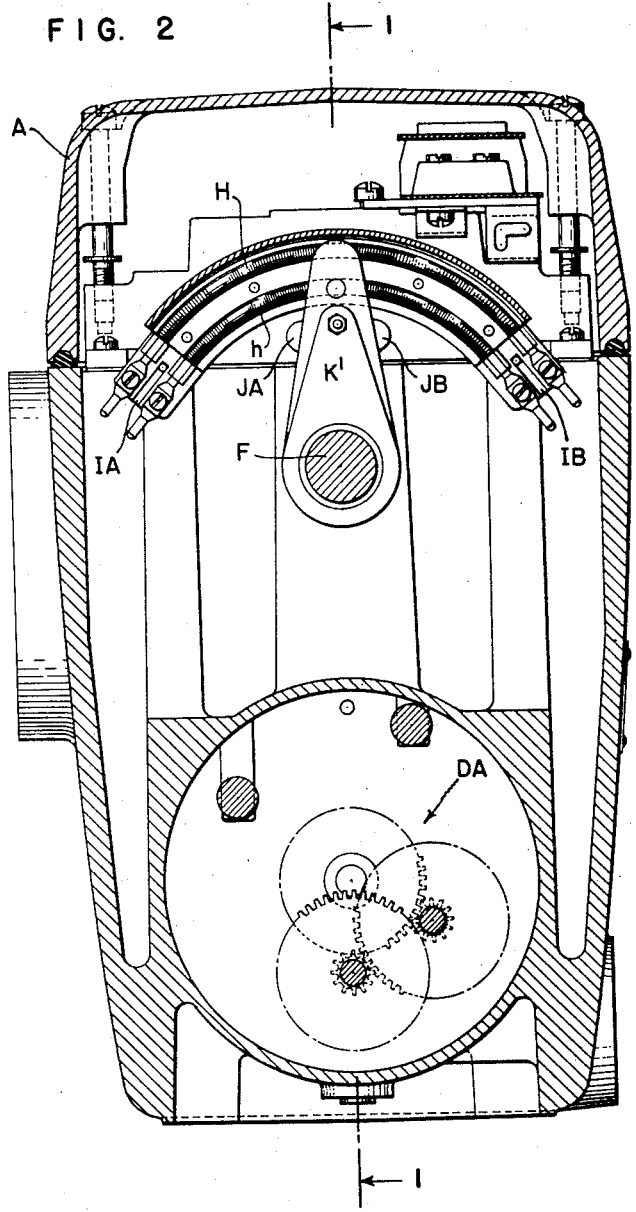
Fig. 2 is a section on the broken line 2—2 of Fig. 1 as viewed in the direction of the arrows.

In the drawings, A designates a motor mechanism housing enclosing a motor unit B. The motor unit B comprises a rotor $b$ through which motor braking mechanism C is adjusted and rotative movements are given to a pinion D, as is hereinafter more fully described. The pinion D operates through intermediate gearing DA to rotate a slow speed main gear E mounted on and rigidly connected to an actuating shaft F. The rotation of the shaft F angularly adjusts a wiper contact G along a stationary slide wire H (shown in Fig. 2 in the form of an arc of about 100° coaxial with the shaft F). As hereinafter explained, a braking mechanism including elements 4, 5, and M is included in the operative connection between the rotor $b$ and the pinion D. The slide wire H is supported by a bracket I attached to the mechanism housing A. The bracket I also supports a second slide wire, or "collector" $h$, in the form of an arc coaxial with the slide wire H but shown as having a shorter radius. The collector $h$ is engaged by a wiper contact $g$. The wiper contacts G and $g$ are carried by arms GA and $ga$ which are connected to and oscillated by an arm J. The arms GA and $ga$, have their inner ends (which are remote from the wiper contacts G and $g$) attached to the arm J and by their own resiliency press the wiper contacts G and $g$ against the slide wires H and $h$, respectively. The arm J is mounted on the shaft F and is normally frictionally held in fixed angular position relative to that shaft. As shown in Fig. 1, the arm J is formed with an annular or ring portion J′ which yieldingly encircles a hub or collar $f$ surrounding and secured to the shaft F. The ring portion J′ extends into an annular space between a radial shoulder portion of the collar $f$ and a washer L.

In normal operation, the arm J is caused to share the oscillatory movements of the shaft F by frictional force impressed on the arm J by an arm K. The latter is rigidly connected to the shaft F through the hub or collar $f$. The range of angular movement of the arm J is restricted by stop members IA and IB (Fig. 2) attached to the housing A. A limit switch mechanism, not shown, may be provided to arrest the movement of the motor B as the arm J approaches either limit of its movements between the stops IA and IB. However, if such limit switch mechanism fails to interrupt the rotation of the shaft F, the driving connection between the arms K and J is interrupted when the arm J engages either of the stops IA and IB. In such case the arm J then remains stationary while the shaft F and arm K may continue to rotate until the normal operative condition of the apparatus is restored.

The normal frictional driving connection between the arms K and J comprises a screw K′ threaded through and normally anchored in the outer end portion of the arm K. The longitudinal adjustment position of the screw K′ relative to the arm K, regulates the contact pressure with which the contacts G and $g$ bear against the slide wire elements H and $h$. One end of the screw K′ extends into a depression $j$ in the outer side of the arm J. The screw K′ may be adjusted to establish the desired contact pressure between the arms K and J when the latter is between and out of engagement with each of the stops IA and IB. As is best seen in Fig. 2, arm J has two ears, JA and JB, which slope at their tips away from arm K.

When arm J engages stop 1A or stop 1B, arm J is held against further rotation while arm K continues to rotate with shaft F. The tip of screw K′ slides down ear JA or JB depending upon the direction of rotation. If shaft F continues to rotate in the same direction, when the rotation of shaft F has continued for almost 360° the tip of screw K′ will slide up the opposite ear JB or JA. Shaft F and arm K can thus rotate without injury to arms J, GA, or $ga$. Thereafter if shaft F and arm K cease the above-mentioned rotation and commerce to rotate in the opposite direction so that arm J would be carried away from the stop JA or JB with which arm J is then in engagement, the tip of screw K′ slides up the ear JA or JB nearest the stop. The tip of screw K' then enters the depression in arm J and turns arm J and the parts carried thereby away from stop JA or JB with which arm J was in engagement.

The brake mechanism C disclosed and claimed herein, comprises novel means for arresting the rotation of the motor rotor b with substantially no delay following the completion of each rebalancing operation. The mechanism C thus practically eliminates, or greatly reduces, over-travel of the rotor which might otherwise occur at the end of each rebalancing operation. The brake mechanism comprises a stationary, cylindrical, brake band M conveniently made of plastic material and coaxial with the stationary stator N and the rotatable rotor b of the motor unit B. The rotor b is mounted on and rigidly secured to a sleeve 1 which is journaled on a motor shaft 2 which, in turn, is journaled in the stationary housing structure. The right portion of the motor sleeve 1, as seen in Figs. 3, 4, 5, and 6, supports and is rigidly connected to a pair of pins 7 and 8 which are rigidly connected to the sleeve 1. The intermediate portion of the motor shaft 2 supports a cylindrical, counter sunk, hub-like member 3, which is held against movement relative to the shaft 2.

The sleeve 1, shaft 2, and hub member 3 collectively support and rotate two braking members 4 and 5 which extend radially away from the shaft 2 in opposite directions. When the rotor b is not rotating, the outer ends of the members 4 and 5 are in frictional engagement with the inner surfaces of the brake band M. The members 4 and 5 have transverse outer end portions 4a and 5a, respectively. These portions are shaped and arranged to bear against the inner side of the stationary brake band M.

The elements 4 and 5 are formed with transverse shoulders 6 and 6a, respectively, at opposite sides of the shaft 2. In the particular form illustrated, the shoulder 6 forms one side wall of a rectangular slot in the element 4, said slot having a wall 6' parallel to the shoulder 6 and at the opposite side of the shaft 2. Similarly, the shoulder 6a of the element 5 forms one side wall of a slot which has its other side wall 6a' parallel to and at the opposite side of the shaft 2 from the shoulder 6a. Said slots in the members 4 and 5 are clearly shown in Figs. 5 and 6, respectively. The shaft 2 extends centrally through each of said slots. Pins 7 and 8, parallel to the shaft 2 and at opposite horizontal sides of the shaft 1, also extend through each slot. The pins 7 and 8 are supported by the sleeve 1 which is rotatable on the shaft 2. The members 4 and 5 are movable simultaneously radially toward and away from the shaft 2 and are guided in their relative radial movements by pins 10 anchored in the hub member 3 and extending through aligned radial slots 11a in the member 4 at opposite sides of the shaft 2, and through aligned parallel slots 11 in the member 5. Transversely extending coil springs 12 and 12a have their outer end portions alongside and welded or otherwise firmly connected to the braking elements 4 and 5, respectively.

When the rotor b is stationary, the springs 12 and 12a hold the outer end portions 4a and 5a of the brake elements 4 and 5 in frictional engagement with the cylinder M and the pins 7 and 8 are out of engagement with the slot walls 6 and 6a. When the motor unit B is energized and the rotor b is subjected to a driving torque, a slight initial rotative movement of the sleeve 1 and pins 7 and 8 is effected without a corresponding rotative movement of the elements 4 and 5. Such rotative movement of the sleeve 1 will cause one of the pins 7 and 8 to engage the shoulder 6 and the other to engage the shoulder 6a. When the initial turning movement of the sleeve 1 is clockwise, as seen in Fig. 3, the pin 7 engages the shoulder 6a of the brake member 5 and pulls its end portion 5a out of frictional engagement with the brake band M. The movement of the sleeve 1, which causes the pin 7 to engage the shoulder 6a, causes the pin 8 to engage the shoulder 6 of the member 4 and move the end portion 4a of the member 4 out of frictional engagement with the brake band M. When the initial movement of the shaft 1 is counter-clockwise as seen in Fig. 5, the pin 7 engages the shoulder 6 of the member 4 and the pin 8 engages the shoulder 6a of the member 5. The pins 7 and 8 then move the brake arm end portions 4a and 5a out of frictional engagement with the brake band M. In all operative positions, the pins 7 and 8 are out of engagement with the shoulders 6' and 6a'.

Following each movement of the pins 7 and 8 into operative engagement, one with the shoulder 6 and the other with the shoulder 6a of the members 4 and 5, respectively, the elements 4 and 5 normally remain in fixed angular positions relative to the pins 7 and 8 until balance is approached and the rotor speed slows down. As soon as the motor speed begins to decrease, the springs 12 and 12a move the elements 4 and 5 radially outward into frictional engagement with the stationary brake band M. Such engagement practically eliminates overtravel of the rotor, due to inertia.

As previously indicated, the mechanism shown in Figs. 1 to 6, is ordinarily employed to produce an adjusting or rebalancing action on and in accordance with the response of an electrical control instrument to a change in a condition measured or regulated by the instrument. An electrical instrument employed to control the operation of the motor unit B may take any one of numerous forms.

One simple form of mechanism which may be employed to control the operation of the motor unit B, is illustrated by way of example in Fig. 7. That figure diagrammatically illustrates a bridge circuit including a slide wire 15 having its ends connected to the adjacent ends of conductors 16 and 17. The other ends of the conductors 16 and 17 are connected to the ends of the slide wire resistor H. The latter is engaged by the wiper contact G carried by the arm GA given rotative adjustments by the shaft F, as shown in Figs. 1 and 2 and hereinbefore described. As diagrammatically shown, the bridge circuit is energized by a direct current source 18 connected between the conductors 16 and 17. The slide wire resistor 15 is engaged by a wiper contact 19 which is adjusted along the resistor 15 in accordance with changes in a controlling condition. As shown in Fig. 7 by way of example, the wiper contact 19 is connected to and adjusted along the slide wire resistor 15 by a Bourdon tube spiral 20 having its stationary end connected by a capillary tube 21 to a thermometer bulb 22. When the temperature to which the bulb 22 is subjected increases or decreases, the wiper contact 19 is moved up and down, respectively, along the slide wire resistor 15.

As diagrammatically shown in Fig. 7, the shaft F, which carries and rotates the arm GA, is angularly adjusted by the rotor b of the motor unit B through the pinion D and intermediate gearing DA. As shown in Fig. 7, the rotor b has one energizing terminal 23 connected to the wiper contact 19, and has a second energizing terminal 24 connected to the arm GA and thereby to the wiper contact G.

With the arrangement shown diagrammatically in Fig. 7, an increase or decrease in the temperature of the thermometer bulb 22 causes the wiper contact 19 to be moved up or down, respectively, along the slide wire 15. The resultant change in the potential transmitted by the terminal 23 to the rotor b will cause the latter to rotate in one direction or the other accordingly as the preceding adjustment of the wiper contact 19 was up or down. The difference between the potentials of the contacts 19 and G produced by the adjustment of the wiper contact 19 will result in a corresponding rebalancing adjustment of the wiper contact G along the slide wire H. In normal operation, when the wiper contact G reaches and tends to move beyond the corresponding limit of its normal range of movement the energizing circuit of the motor unit B may well be automatically interrupted.

While, in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims and that in some cases certain features of my invention may be used to advantage without a corresponding use of other features.

Herein is disclosed but not claimed a brake system which is disclosed and claimed in a copending application for U.S. Patent Serial No. 412,235 by David W. Bantle, assignor to Minneapolis-Honeywell Regulator Company, filed on February 24, 1954.

Having now described my invention, what I claim as new and desire to secure by Letters Patent is:

1. Mechanism including a motor having a housing and a rotor and a stator and a driving sleeve and a motor shaft rotated by said motor, and in combination therewith: slidewire elements mounted on said motor housing, a first arm rigidly connected to said motor shaft, a second arm rotatably mounted on said motor shaft and having frictional engagement with said first arm, third arms carried by said second arm, wiper contacts on said third arms in engagement with said slidewire elements, and means interposed between said first arm and said second arm for varying the frictional engagement therebetween.

2. Mechanism according to claim 1 in which said second arm has joined to it ears which slope at their tips away from said first arm.

3. Mechanism including a motor having a housing and means for energizing and de-energizing said motor and a driving sleeve and a motor shaft rotated by said motor, and in combination therewith: brake mechanism operative to arrest the rotation of said shaft when the motor is de-energized comprising a stationary brake band coaxial with and surrounding said shaft, two braking members mounted on and extending radially away from said shaft and each having a braking end radially movable into and out of operative engagement with said brake band and each having a transverse shoulder at the opposite side of said shaft from its braking end and from the corresponding shoulder of the other member, said shoulders being spaced away from one another by a distance greater than the shaft diameter to permit radial movement of each member into and out of engagement with said brake band, a hub member mounted on said shaft and angularly movable thereon, guiding means connecting each braking member to said member for radial movement relative to said member and shaft, projections parallel to and angularly displaced from one another about said shaft and connected to and rotating with the said sleeve and each adapted to engage the shoulder of one of said members and move the latter out of engagement with said band when the sleeve starts into rotation, resilient means acting between each of said members and tending to move the latter into engagement with said band, slidewire elements mounted on said motor housing, a first arm rigidly connected to said motor shaft, a second arm rotatably mounted on said motor shaft and having frictional engagement with said first arm, third arms carried by said second arm, wiper contacts on said third arms in engagement with said slide wire elements, and means interposed between said first arm and said second arm for varying the frictional engagement therebetween.

4. Means for positioning one element in correspondence with another, comprising an electric motor mechanism, including a housing, a stator, a rotor cooperating with said stator, an actuating shaft turned by said rotor, stationary slide wire elements located on said housing adjacent said shaft, a first arm rigidly connected to said shaft, a second arm rotatably mounted on said shaft and having frictional engagement with said first arm, a pair of stops each located adjacent one end of said slide wire elements and in the path of motion of said second arm so as to be engaged thereby and out of the path of motion of said first arm so that said first arm is freely rotatable past said stops, means carried by one of said arms and providing yielding driving engagement between said arms and adapted to break the driving engagement between said arms whenever said second arm engages one of said stops at the end of its path of travel so as to permit rotation of said first arm, and ears on one of said arms and sloping at their tips away from the other of said arms and located in the path of travel of said means when said means has broken the driving engagement between said arms and serving to permit said means to re-establish the driving engagement between said arms.

References Cited in the file of this patent

UNITED STATES PATENTS

| | | |
|---|---|---|
| 1,621,442 | Thropp | Mar. 15, 1927 |
| 2,042,280 | Stuart | May 26, 1936 |
| 2,214,807 | Buckley | Sept. 17, 1940 |
| 2,236,411 | Metcalf | Mar. 25, 1941 |
| 2,277,883 | Rich | Mar. 31, 1942 |
| 2,558,326 | Van Dyke | June 26, 1951 |
| 2,656,497 | Schweighofer et al. | Oct. 20, 1953 |